United States Patent [19]

Takahashi et al.

[11] 4,090,375
[45] May 23, 1978

[54] CONSTANT VELOCITY UNIVERSAL JOINT

[75] Inventors: Koichi Takahashi, Yokohama; Nobuteru Hitomi, Yokosuka; Taisuke Kizu; Hirotugu Honchi, both of Fujisawa; Kazuo Arita, Atsugi, all of Japan

[73] Assignee: Nissan Motor Company, Ltd., Japan

[21] Appl. No.: 684,242

[22] Filed: May 7, 1976

[30] Foreign Application Priority Data

May 8, 1975 Japan .................................. 50-55172

[51] Int. Cl.² ................................................ F16D 3/00
[52] U.S. Cl. ........................................................... 64/21
[58] Field of Search ............................................ 64/21

[56] References Cited
U.S. PATENT DOCUMENTS 3,935,717  2/1976  Welschof .................................. 64/21

*Primary Examiner*—Alan Cohan

[57] ABSTRACT

A constant velocity universal joint comprises an outer joint element having grooves on its spherical inner surface. An inner joint element is positioned within the outer joint element and is provided with grooves on its spherical outer surface to form pairs of opposed grooves with the grooves on the outer joint element. A ball is positioned in every pair of opposed grooves and a cage disposed between the two joint elements retains the balls in a plane perpendicular to the axis of the cage. The cage is guided within the outer joint element by a spherical surface on the outer face of the cage and is guided with respect to the inner joint element by a spherical surface on the inner face of the cage. To facilitate assembly in the joint without weakening structural strength of the cage, the cage is provided with transverse notches or grooves in two diagonal positions. Each groove is formed at a ball aperture and has a width and a depth so as to be capable of receiving a ridge between adjacent grooves on the outer joint element.

14 Claims, 11 Drawing Figures

MAX. DIAMETRAL AXIS OF SURFACE 12

CONSTANT VELOCITY UNIVERSAL JOINT

The present invention relates to a constant velocity universal joint.

A known form of constant velocity universal joint comprises an outer joint element having grooves on its spherical inner surface. An inner joint element is positioned within the outer joint element and is provided with grooves on its spherical outer surface to form pairs of opposed grooves with the grooves on the outer joint element. A ball is positioned in every pair of opposed grooves and a cage disposed between the two joint elements retains the balls in a plane perpendicular to the axis of the cage. The cage is guided within the outer joint element by a spherical surface on its outer face and is guided with respect to the inner joint element by a spherical surface on its ball apertures and at least one ball aperture of all is made larger in a length and a width than the other ball apertures to make possible axial insertion of the cage into the corresponding outer joint element in a position pivoted 90° from the final position. Because webs on the cage adjacent to the larger ball aperture are narrower than the other webs, the cage is structurally weak so that it is easily deformed during operation of the joint and it requires careful attention when subjecting it to thermal treatment. Although the size of the balls for the joint must be increased to reduce contact pressure between balls and groove side walls if it is desired to increase the maximum torque transmitted by the joint, but increasing the ball size will require enlarging the size of the ball apertures, reducing width of the narrower webs on the cage adjacent to the larger ball aperture and thus making the cage too weak to withstand mechanical stress during operation of the joint. This construction has a disadvantage that structural volume of the joint becomes large to transmit sufficiently high torque for practical use.

A main object of the present invention is to provide a constant velocity universal joint which is free from the disadvantage just discussed.

A specific object of the present invention is to provide a compact constant velocity universal joint.

Another object of the present invention is to provide a constant velocity universal joint which can transmit higher torques with the same structural volume of the joint.

Other objects, features and advantages of the present invention will become apparent from the following description taken in conjunction with the accompanying drawings, in which.

Figure 1:
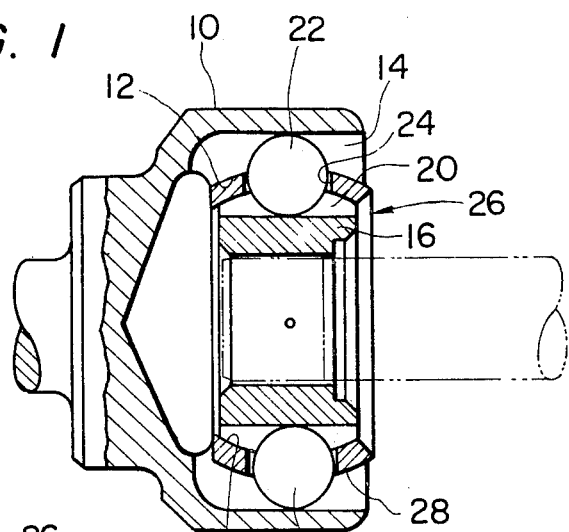
FIG. 1 is a longitudinal sectional view of a constant velocity universal joint.

FIGS. 1 – 4 illustrate a constant velocity universal joint comprising an outer joint element 10 having an axis, a spherical inner surface 12 and six longitudinal ball guide grooves 14 on its spherical inner surface 12. Positioned within the outer joint element 10 is an inner joint element 16 having a spherical outer surface (not shown) and six ball guide grooves 20 on its outer spherical surface 18 which are opposed from the grooves 14 of the outer joint element 10.

A ball 22 is positioned in each pair of opposed grooves in order to transmit a torque between the outer and inner joint elements 10 and 16. The balls 22 are restrained in ball apertures 24 of a ball cage 26. The ball apertures 24 have the same size.

Figure 2:
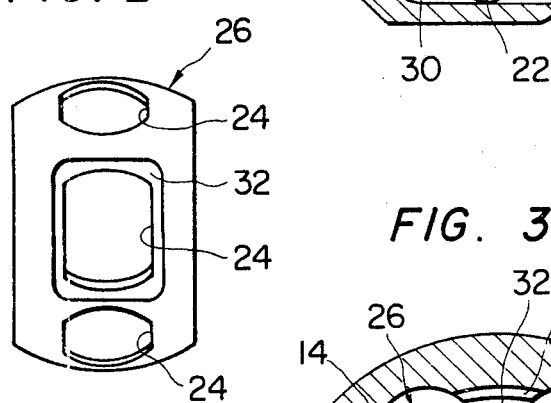
FIG. 2 is a side elevational view of a ball cage in the joint shown in FIG. 1.
Figure 3:
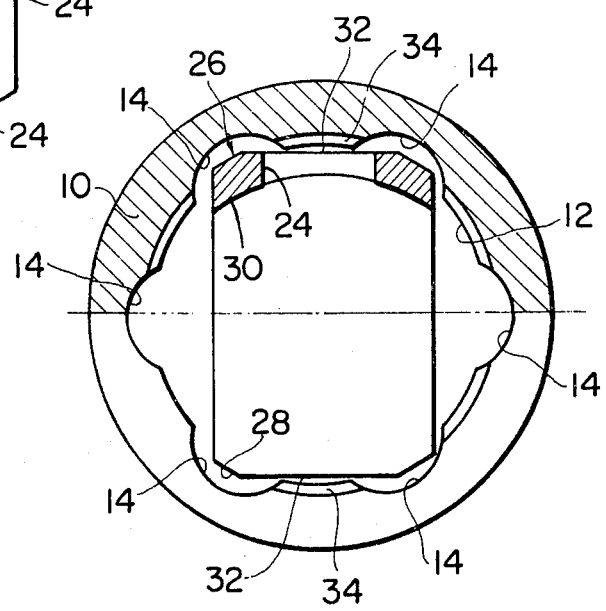
FIG. 3 is an end elevational view, partly in section, of an outer joint element in the joint shown in FIG. 1 and the cage in the assembly position.
Figure 4:
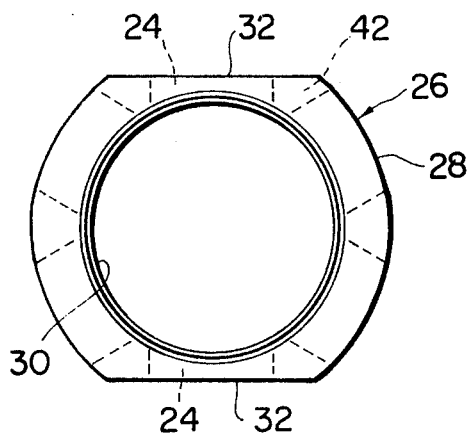
FIG. 4 is an end elevational view of the cage.
Figure 5:
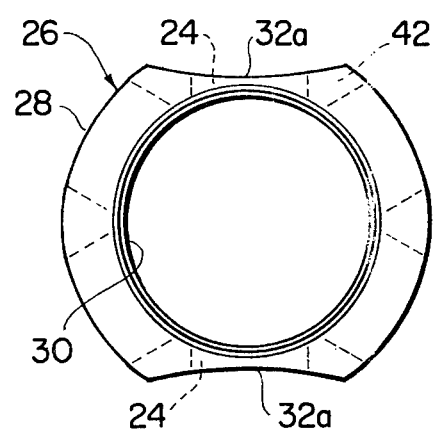
FIG. 5 is an end elevational view of a modified cage.

The cage 26 is provided with a spherical surface 28 on its outer face which coacts with the spherical inner surface 12 on the outer joint element 10. On the inner face the cage 26 is provided with a spherical surface 30 which coacts with the spherical inner surface 18 on the inner joint element 16. As illustrated in FIGS. 2 – 4 the cage 26 is provided with flat surfaces 32 in two diagonal positions. Each flat surface 32 includes therein one ball aperture 24 (see FIG. 2) and is spaced from the spherical inner surface 12 on the outer joint element 10 to provide a space which is sized so as to be capable of receiving a ridge 34 between adjacent grooves 14 on the outer joint element 10. The flat surface may be recessed as shown in FIG. 5 and designated as 32a.

Figure 6:
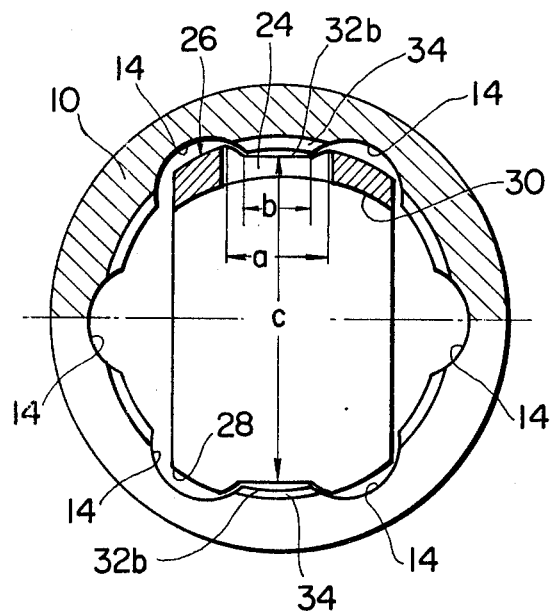
FIG. 6 is an end elevational view, partly in section, of an outer joint element and a cage in the assembly position.

Referring to FIG. 6 cage 26 is provided with transverse grooves 32b in two diagonal positions and at two ball apertures 34. Each transverse groove 32b has a width and depth so as to be capable of receiving a ridge 34 between adjacent ball guide grooves 14 on an outer joint element 10.

The provision of flat or recessed surface 32 or 32a or transverse groove 32b makes possible of introduction of the cage into the outer joint element as follows. In assembly the cage 26 can be axially inserted into the outer joint element 10 in a position pivoted 90° C from its final position. After insertion the cage 26 is then pivoted 90° so that its longitudinal axis is aligned with the longitudinal axis of the outer joint element 10. Subsequently, the cage 26 is then rotated about its axis about half the distance between adjacent ball apertures 24 of the cage 26 so that the ball apertures 24 register with the ball grooves 14 on the outer joint element 10.

Figure 7:
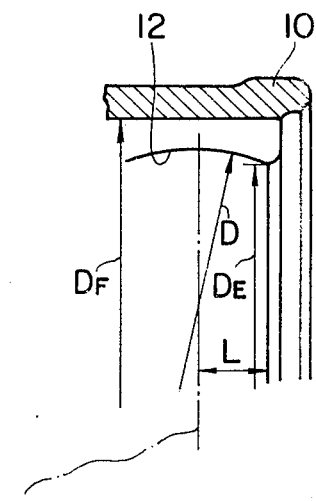
FIG. 7 is a half longitudinal sectional view of the outer joint element shown in FIG. 6.
Figure 8:
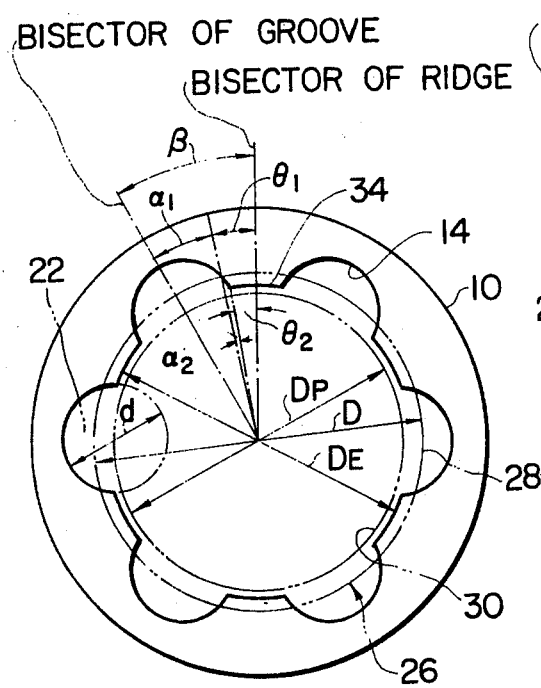
FIG. 8 is an end elevational view of the outer joint element shown in FIG. 6 and the cage shown in FIG. 6 and the cage shown in phantom.

Referring to FIGS. 6 – 8 dimensional relationships between transverse grooves 32b of the cage 26 and outer joint element 10 are represented as:

$$a \geqq D\sin\theta_1$$

$$b \geqq D_E\sin\theta_2$$

$$c \geqq D_E\sin\theta_2$$

where:
$\theta_1 = \beta - \alpha_1$
$\theta_2 = \beta - \alpha_2$
$\beta = \pi/N$ ($N$: number of balls 22)
$\alpha_1 = \cos^{-1}(D_p^2 + D^2 - d^2/2D_pD)$ $$\alpha_2 = \cos^{-1}(D_E^2 + D^2 - d^2/2D_E D)$$
$$D_E = \sqrt{D^2 - 4L^2}$$

Figure 9:
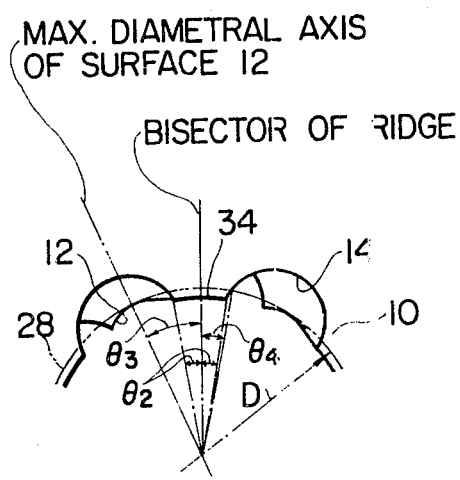
FIG. 9 is a partial end elevational view, in schematic, of an outer joint element provided with spiral ball guide grooves.

If grooves 14 are skewed or spiral as illustrated in FIG. 9, length $a$ is represented by the following equation:

$$a \geq b/2 (\sin\theta_4 + \sin\theta_3)$$

Preferably grooves 32b extend along the center line of the ball guide grooves 14 on the outer joint element 10 to minimize the size of each groove 32b.

Figure 10:
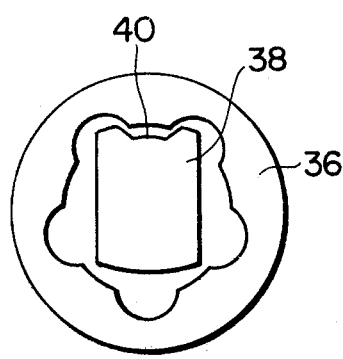
FIG. 10 is an end elevational view, in schematic, of an outer joint element and a cage in the assembly position.

FIG. 10 shows an outer joint element 36 including an odd number, five, of ball grooves and a ball cage 38 is provided with only one transverse groove 40 at one ball aperture.

It will be noted that because each transverse groove is provided at one ball aperture without reducing in width adjacent webs 42 (see FIGS. 4 - 6) on the cage, all of the webs 42 of the cage have the same width. Thus the cage is free from the structural weakness encountered in the conventional construction of cage discussed before. The cage permits the joint to employ larger balls and thus cause the latter to be capable of transmitting higher torques with the same structural volume of the joint. In other words the structural volume of the joint according to the present invention can be made compact as compared to the conventional construction. Moreover, because the ball pitch circle can have a small diameter, the balls are subjected to relatively little displacements or movements during operation of the joint, thus increasing durability of the joint.

Figure 11:
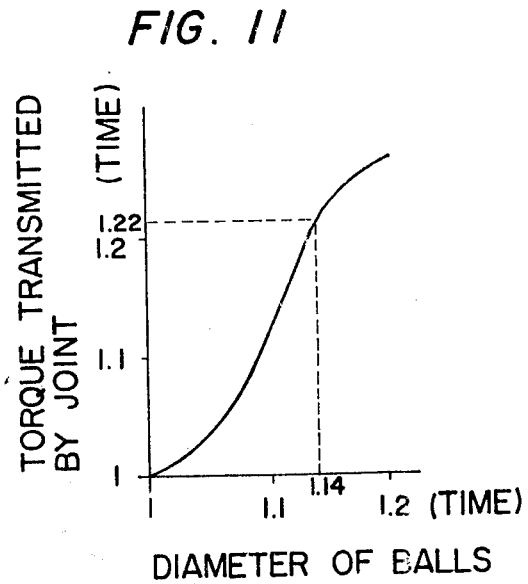
FIG. 11 shows a curve of torque versus ball size.

FIG. 11 shows a characteristic curve showing increasing rate of maximum torque transmitted by the joint of the invention with respect to increasing rate of the balls for the joint if ratio of the diameter of ball pitch circle to diameter of each ball is 3.5:1. It is to be noted that increasing the diameter of the balls to 1.1 times will result in increasing of the maximum torque to 1.22 times. In this case diametral distance between opposed grooves on the outer joint element ($D_F$, see FIG. 7) will become 1.03 times. Therefore it will be appreciated that the constant velocity universal joint according to the present invention can transmit higher torques with the same structural volume of the joint.

What is claimed is:

1. A constant velocity universal joint comprising:
    an outer joint element having a spherical inner surface and a plurality of grooves on its spherical inner surface;
    an inner joint element having a spherical outer surface and a plurality of grooves on its spherical outer surface opposite from said outer element grooves to define pairs of opposed grooves;
    a cage having a first spherical surface on its outer face coacting with the spherical inner surface of the outer joint element and a second spherical surface on its inner face coacting with the spherical outer surface of the inner joint element;
    a plurality of balls guided in the pairs of opposed grooves, respectively, for transmitting torque between the inner and outer joint elements;
    the cage having a plurality of ball apertures receiving the balls, respectively, the ball apertures having the same size, the outer face of the cage being recessed from the first spherical surface at an area adjacent at least one of the ball apertures to provide a relief of a ridge between two adjacent grooves of the outer joint element upon axially inserting the cage in a position pivoted 90° from its final position wherein the longituindal axis of the cage is aligned with the longitudinal axis of the outer joint element.

2. A constant velocity universal joint as claimed in claim 1, in which the cage is provided with at least one flat surface, the flat surface including therein one of the ball apertures and being spaced from the spherical inner surface of the outer joint element to provide a space therebetween which is sized so as to be capable of receiving a ridge between adjacent grooves of the outer joint element.

3. A constant velocity universal joint as claimed in claim 1, in which the cage is provided with two flat surfaces in two diagonal positions, each flat surface including therein one of the ball apertures and being spaced from the spherical inner surface of the outer joint element to provide a space therebetween which is sized so as to be capable of receiving a ridge between adjacent grooves of the outer joint element.

4. A constant velocity universal joint as claimed in claim 1, in which the cage is provided with at least one recessed surface, the recessed surface including therein one of the ball apertures and being spaced from the spherical inner surface of the outer joint element to provide a space therebetween which is sized so as to be capable of receiving a ridge between adjacent grooves of the outer joint element.

5. A constant velocity universal joint as claimed in claim 1, in which the cage is provided with two recessed surfaces in two diagonal positions, each recessed surface including therein one of the ball apertures and being spaced from the spherical inner surface of the outer joint element to provide a space therebetween which is sized so as to be capable of receiving a ridge between adjacent grooves of the outer joint element.

6. A constant velocity universal joint as claimed in claim 1, in which the cage is provided with at least one transverse groove at one of the ball apertures, the transverse groove having a width and a depth so as to be capable of receiving a ridge between adjacent grooves of the outer joint element.

7. A constant velocity universal joint as claimed in claim 1, in which the cage is provided with two transverse grooves in two diagonal positions, each transverse grooves being provided at one of the ball apertures and having a width and a depth so as to be capable of receiving a ridge between adjacent grooves of the outer joint element.

8. A constant velocity universal joint comprising:
    an outer joint element having a spherical inner surface and a plurality of grooves on its spherical inner surface;
    an inner joint element having a spherical outer surface and a plurality of grooves on its spherical outer surface opposite from said outer element grooves to define pairs of opposed grooves;
    a cage having a first spherical surface on its outer face coacting with the spherical inner surface of the outer joint element and a second spherical surface on its inner face coacting with the spherical outer surface of the inner joint element, the first and the second spherical surfaces of the cage having a common center of curvature;
    a plurality of balls guided in the pairs of opposed grooves, respectively, for transmitting torque between the inner and outer joint elements;

the cage having a plurality of ball apertures receiving the balls, respectively, the ball apertures having the same size, the outer face of the cage being recessed from the first spherical surface at an area adjacent at least one of the ball apertures to provide a relief of a ridge between adjacent two grooves of the outer joint element upon axially inserting the cage in a position pivoted 90° from its final position wherein the longitudinal axis of the cage is aligned with the longitudinal axis of the outer joint element.

9. A constant velocity universal joint as claimed in claim 8, in which the cage is provided with at least one flat surface, the flat surface including therein one of the ball apertures and being spaced from the spherical inner surface of the outer joint element to provide a space therebetween which is sized so as to be capable of receiving a ridge between adjacent grooves of the outer joint element.

10. A constant velocity universal joint as claimed in claim 8, in which the cage is provided with two flat surfaces in two diagonal positions, each flat surface including therein one of the ball apertures and being spaced from the spherical inner surface of the outer joint element to provide a space therebetween which is sized so as to be capable of receiving a ridge between adjacent grooves of the outer joint element.

11. A constant velocity universal joint as claimed in claim 8, in which the cage is provided with at least one recessed surface, the recessed surface including therein one of the ball apertures and being spaced from the spherical inner surface of the outer joint element to provide a space therebetween which is sized so as to be capable of receiving a ridge between adjacent grooves of the outer joint element.

12. A constant velocity universal joint as claimed in claim 8, in which the cage is provided with two recessed surfaces in two diagonal positions, each recessed surface including therein one of the ball apertures and being spaced from the spherical inner surface of the outer joint element to provide a space therebetween which is sized so as to be capable of receiving a ridge between adjacent grooves of the outer joint element.

13. A constant velocity universal joint as claimed in claim 8, in which the cage is provided with at least one transverse groove at one of the ball apertures, the transverse groove having a width and a depth so as to be capable of receiving a ridge between adjacent grooves of the outer joint element.

14. A constant velocity universal joint as claimed in claim 8, in which the cage is provided with two transverse grooves in two diagonal positions, each transverse grooves being provided at one of the ball apertures and having a width and a depth so as to be capable of receiving a ridge between adjacent grooves of the outer joint element.

* * * * *